United States Patent
Hosoya et al.

(10) Patent No.: US 9,670,329 B2
(45) Date of Patent: Jun. 6, 2017

(54) CYCLIC OLEFIN RESIN COMPOSITION FILM

(71) Applicant: DEXERIALS CORPORATION, Tokyo (JP)

(72) Inventors: Ken Hosoya, Shiogama (JP); Akihiro Horii, Miyagi-gun (JP); Kei Obata, Miyagi-gun (JP); Taku Ishimori, Sendai (JP); Kanako Hashimoto, Miyagi-gun (JP); Kazuki Hirata, Miyagi-gun (JP)

(73) Assignee: DEXERIALS CORPORATION, Tokyo (JP)

( * ) Notice: Subject to any disclaimer, the term of this patent is extended or adjusted under 35 U.S.C. 154(b) by 0 days.

(21) Appl. No.: 15/100,662

(22) PCT Filed: Dec. 4, 2014

(86) PCT No.: PCT/JP2014/082169
§ 371 (c)(1),
(2) Date: Jun. 1, 2016

(87) PCT Pub. No.: WO2015/083808
PCT Pub. Date: Jun. 11, 2015

(65) Prior Publication Data
US 2016/0311987 A1 Oct. 27, 2016

(30) Foreign Application Priority Data
Dec. 4, 2013 (JP) .................................. 2013-250802

(51) Int. Cl.
*C08L 53/02* (2006.01)
*C08J 5/18* (2006.01)
*C08L 45/00* (2006.01)

(52) U.S. Cl.
CPC ................ *C08J 5/18* (2013.01); *C08L 45/00* (2013.01); *C08J 2345/00* (2013.01); *C08J 2453/00* (2013.01); *C08J 2453/02* (2013.01); *C08L 53/025* (2013.01); *C08L 2203/16* (2013.01)

(58) Field of Classification Search
None
See application file for complete search history.

(56) References Cited

U.S. PATENT DOCUMENTS

| | | | | |
|---|---|---|---|---|
| 6,803,081 B2* | 10/2004 | Paul | ..................... | B65D 25/205 |
| | | | | 428/34.1 |
| 2006/0036033 A1 | 2/2006 | Toyoshima et al. | | |
| 2013/0294778 A1* | 11/2013 | Kim | ........................ | H04B 10/40 |
| | | | | 398/135 |
| 2014/0049559 A1* | 2/2014 | Fleck | .................... | G03H 1/2249 |
| | | | | 345/633 |
| 2015/0348819 A1* | 12/2015 | Taya | ..................... | H01L 21/683 |
| | | | | 428/343 |

FOREIGN PATENT DOCUMENTS

| | | |
|---|---|---|
| JP | H07-238190 A | 9/1995 |
| JP | H09-176397 A | 7/1997 |
| JP | 2004-156048 A | 6/2004 |
| JP | 2007-154074 A | 6/2007 |
| WO | 2004/035688 A1 | 4/2004 |

OTHER PUBLICATIONS

Mar. 10, 2015 Search Report issued in International Patent Application No. PCT/JP2014/082169.
Mar. 11, 2016 International Preliminary Report on Patentability issued in PCT/JP2014/082169.

* cited by examiner

*Primary Examiner* — Jeffrey Mullis
(74) *Attorney, Agent, or Firm* — Oliff PLC (57) ABSTRACT

Provided is a cyclic olefin resin composition film having a small in-plane retardation and high toughness. The cyclic olefin resin composition film contains a cyclic olefin resin and a styrene elastomer having a storage modulus of lower than 100 MPa at 0° C. to 100° C. The styrene elastomer is dispersed in the cyclic olefin resin in an amount of 5 to 35 wt %. With this configuration, it is possible to lower the in-plane retardation of the film while ensuring the high toughness of the film.

8 Claims, 6 Drawing Sheets

CYCLIC OLEFIN RESIN COMPOSITION FILM

FIELD OF THE INVENTION

The present invention relates to a cyclic olefin resin composition film in which an elastomer is added and dispersed into a cyclic olefin resin. The present application claims priority from Japanese Patent Application No. 2013-250802, which was filed to the Japanese Patent Office on Dec. 4, 2013, and the entire contents of which are herein incorporated by reference.

BACKGROUND ART

A cyclic olefin resin is an amorphous thermoplastic olefin resin that has a cyclic olefin skeleton in its main chain and exhibits excellent performance such as good optical properties (e.g. transparency and low birefringence), low water absorbency, dimensional stability and high moisture resistance resulting therefrom and the like. Accordingly, films or sheets of cyclic olefin resins are expected to be useful for various optical applications e.g. phase difference films, polarizer protective films and light diffusion plates and for moisture-proof packaging applications e.g. medicinal product packages and food packages.

Since a film of cyclic olefin resin is low in toughness, it is known to improve the toughness of the cyclic olefin resin film by the addition and dispersion of an elastomer having hard and soft segments into the cyclic olefin resin (see, for example, Patent Literature 1).

However, the addition and dispersion of such an elastomer impairs the low refractive index of the cyclic olefin resin so that the resulting elastomer-dispersed cyclic olefin resin film shows a large in-plane retardation and would not be suitable for practical use.

CITATION LIST

Patent Literatures

Patent Literature 1: Japanese Laid-Open Patent Publication No. 2004-156048

SUMMARY OF THE INVENTION

Problems to be Solved by the Invention

The present invention has been made in view of the above conventional circumstance. It is an object of the present invention to provide a cyclic olefin resin composition film having a small in-plane retardation and high toughness.

Means for Solving the Problems

The present inventors have found that the addition of a styrene elastomer having a specific storage modulus to a cyclic olefin resin makes it possible to improve an in-plane retardation while maintaining high toughness. The present invention is based on this finding.

Namely, there is provided according to one aspect of the present invention a cyclic olefin resin composition film, comprising: an addition copolymer of norbornene and ethylene; and a styrene elastomer having a storage modulus of 20 MPa or lower at 0° C. to 100° C.

There is provided according to another aspect of the present invention a method for producing a cyclic olefin resin composition film, comprising: melting an addition copolymer of norbornene and ethylene together with a styrene elastomer having a storage modulus of 20 MPa or lower at 0° C. to 100° C., thereby yielding a molten cyclic olefin resin composition, and extruding the molten cyclic olefin resin composition into a film shape in which the styrene elastomer is dispersed in the cyclic olefin resin.

The cyclic olefin resin composition film according to the present invention is suitable for use in a transparent conductive element, an input device, a display device and an electronic apparatus.

Effects of the Invention

In the present invention, the styrene elastomer having a storage modulus of 20 MPa or lower at 0° C. to 100° C. is dispersed in the addition copolymer of norbornene and ethylene, whereby the resulting cyclic olefin resin composition film attain a small in-plane retardation and high toughness.

DESCRIPTION OF EMBODIMENTS

Embodiments of the present invention will be described below in the following order with reference to the drawings.

1. Cyclic olefin resin composition film
2. Production method of cyclic olefin resin composition film
3. Applications to electronic apparatuses
4. Examples

1. Cyclic Olefin Resin Composition Film

A cyclic olefin resin composition film according to the present embodiment contains a cyclic olefin resin and a styrene elastomer having a storage modulus of lower than 100 MPa at 0° C. to 100° C. and thereby combines a small in-plane retardation with high toughness.

Figure 1:
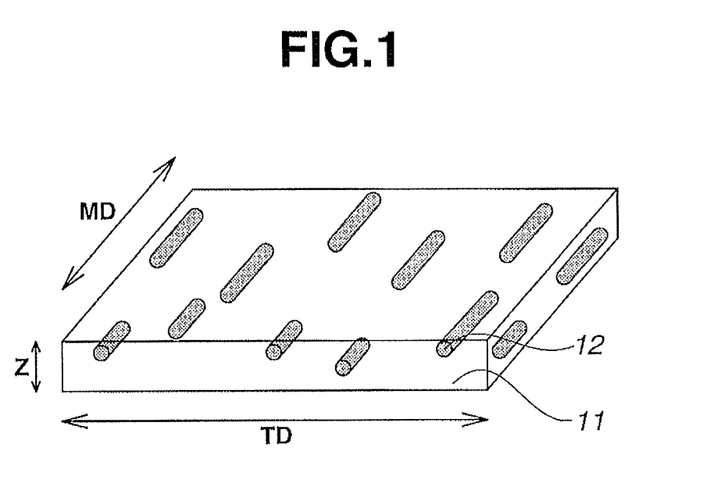
FIG. 1 is a sectional perspective view showing a structure of a cyclic olefin resin composition film according to one embodiment of the present invention.

FIG. 1 is a sectional perspective view showing an example of the cyclic olefin resin composition film according to the present embodiment. For example, the cyclic olefin resin composition film is in the form of a rectangular film or sheet having a width direction (TD: transverse direction) as the X direction, a length direction (MD: machine direction) as the Y direction and a thickness direction as the Z direction. The thickness Z of the cyclic olefin resin composition film is preferably 0.1 μm to 2 mm, more preferably 1 μm to 1 mm.

The cyclic olefin resin 11 and the styrene elastomer 12 are contained in the cyclic olefin resin composition film, with the styrene elastomer 12 being dispersed in the cyclic olefin resin 11 in an amount of 5 to 35 wt %. In other words, the mass % ratio of the cyclic olefin resin to the styrene elastomer is in a range of 95/5 to 65/35 (on the basis of the total amount of the cyclic olefin resin and the styrene elastomer as 100 mass %). The mass % ratio of the cyclic olefin resin to the styrene elastomer is preferably in a range of 93/7 to 80/20. When the amount of the styrene elastomer 12 added is too large, the optical properties (such as retardation and haze) of the film may be lowered. When the amount of the styrene elastomer 12 added is too small, the toughness of the film may not be sufficient.

The cyclic olefin resin and the styrene elastomer will be next explained below in more detail.

[Cyclic Olefin Resin]

The cyclic olefin resin is a polymer compound whose main chain is formed of carbon-carbon bonds and having a cyclic hydrocarbon structure in at least a part of the main chain. The cyclic hydrocarbon structure is introduced with the use of a cyclic hydrocarbon compound having at least one olefinic double bond (i.e. a cyclic olefin), as typified by norbornene and tetracyclododecene, as a monomer.

The cyclic olefin resin can be classified as: (1) an addition (co)polymer of a cyclic olefin, or a hydrogenated product thereof; (2) an addition copolymer of a cyclic olefin and an α-olefin, or a hydrogenated product thereof; or (3) a ring-opening (co)polymer of a cyclic olefin, or a hydrogenated product thereof.

Specific examples of the cyclic olefin are: monocyclic olefins such as cyclopentane, cyclohexene, cyclooctene, cyclopentadiene, and 1,3-cyclohexadiene; bicyclic olefins such as bicyclo[2.2.1]hept-2-ene (common name: norbornene), 5-methyl-bicyclo[2.2.1]hept-2-ene, 5,5-dimethyl-bicyclo[2.2.1]hept-2-ene, 5-ethyl-bicyclo[2.2.1]hept-2-ene, 5-butyl-bicyclo[2.2.1]hept-2-ene, 5-ethylidene-bicyclo[2.2.1]hept-2-ene, 5-hexyl-bicyclo[2.2.1]hept-2-ene, 5-octyl-bicyclo[2.2.1]hept-2-ene, 5-octadecyl-bicyclo[2.2.1]hept-2-ene, 5-methylidene-bicyclo[2.2.1]hept-2-ene, 5-vinyl-bicyclo[2.2.1]hept-2-ene, and 5-propenyl-bicyclo[2.2.1]hept-2-ene;

tricyclic olefins such as tricyclo[4.3.0.1$^{2,5}$]deca-3,7-diene (common name: dicyclopentadiene), tricyclo[4.3.0.1$^{2,5}$]dec-3-ene, tricyclo[4.4.0.1$^{2,5}$]undeca-3,7-diene or tricyclo[4.4.0.1$^{2,5}$]undeca-3,8-diene, or a partially hydrogenated product (or addition product of cyclopentadiene and cyclohexane) thereof, that is, tricyclo[4.4.0.1$^{2,5}$]undec-3-ene, 5-cyclopentyl-bicyclo[2.2.1]hept-2-ene, 5-cyclohexyl-bicyclo[2.2.1]hept-2-ene, 5-cyclohexenyl-bicyclo[2.2.1]hept-2-ene, and 5-phenyl-bicyclo[2.2.1]hept-2-ene;

tetracyclic olefins such as tetracyclo[4.4.0.1$^{2,5}$.1$^{7,10}$]dodec-3-ene (also simply referred to as tetracyclododecene), 8-methyl-tetracyclo[4.4.0.1$^{2,5}$.1$^{7,10}$]dodec-3-ene, 8-ethyl-tetracyclo[4.4.0.1$^{2,5}$.1$^{7,10}$]dodec-3-ene, 8-methylidene-tetracyclo[4.4.0.1$^{2,5}$.1$^{7,10}$]dodec-3-ene, 8-ethylidene-tetracyclo[4.4.0.1$^{2,5}$.1$^{7,10}$]dodec-3-ene, 8-vinyl-tetracyclo[4.4.0.1$^{2,5}$.1$^{7,10}$]dodec-3-ene, and 8-propenyl-tetracyclo[4.4.0.1$^{2,5}$.1$^{7,10}$]dodec-3-ene; and polycyclic olefins such as 8-cyclopentyl-tetracyclo[4.4.0.1$^{2,5}$.1$^{7,10}$]dodec-3-ene, 8-cyclohexyl-tetracyclo[4.4.0.1$^{2,5}$.1$^{7,10}$]dodec-3-ene, 8-cyclohexenyl-tetracyclo[4.4.0.1$^{2,5}$.1$^{7,10}$]dodec-3-ene, 8-phenyl-cyclopentyl-tetracyclo[4.4.0.1$^{2,5}$.1$^{7,10}$]dodec-3-ene, tetracyclo[7.4.0.1$^{3,6}$.0$^{1,9}$.0$^{2,7}$]tetradeca-4,9,11,13-tetraene (also referred to as 1,4-methano-1,4,4a,9a-tetrahydrofluorene), tetracyclo[8.4.0.1$^{4,7}$.0$^{1,10}$.0$^{3,8}$]pentadeca-5,10,12,14-tetraene (also referred to as 1,4-methano-1,4,4a,5,10,10a-hexahydroanthracene), pentacyclo[6.6.1.1$^{3,6}$.0$^{2,7}$.0$^{9,14}$]-4-hexadecene, pentacyclo[6.5.1.1$^{3,6}$.0$^{2,7}$.0$^{9,13}$]-4-pentadecene, pentacyclo[7.4.0.0$^{2,7}$.1$^{3,6}$.1$^{10,13}$]-4-pentadecene, heptacyclo[8.7.0.1$^{2,9}$.1$^{4,7}$.1$^{11,17}$.0$^{3,8}$.0$^{12,16}$]-5-eicosene, heptacyclo[8.7.0.1$^{2,9}$.0$^{3,8}$.1$^{4,7}$.1$^{12,17}$.1$^{13,16}$]-14-eicosene, and a tetramer of cyclopentadiene. These cyclic olefins can be used solely or in combination of two or more kinds thereof.

Specific examples of the α-olefin copolymerizable with the cyclic olefin are α-olefins of 2 to 20 carbon atoms, preferably α-olefins of 2 to 8 carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene.

These α-olefins can be used solely or in combination of two or more kinds thereof. The amount of the α-olefin(s) used is in a range of 5 to 200% relative to the amount of the cyclic polyolefin.

There are no particular limitations on the process of polymerization of the cyclic olefin or polymerization of the cyclic olefin and the α-olefin and the process of hydrogenation of the resulting polymer. The polymerization and the hydrogenation can be performed by know processes.

In the present embodiment, an addition copolymer of ethylene and norbornene is preferably used as the cyclic olefin resin.

There is also no particular limitation on the structure of the cyclic olefin resin. Although the cyclic olefin resin can have a linear structure, a branched structure or a cross-linked structure, it is preferable that the cyclic olefin resin has a linear structure.

The number-average molecular weight of the cyclic olefin resin as measured by GPC method is generally 5000 to 300000, preferably 10000 to 150000, more preferably 15000 to 100000. When the number-average molecular weight of the cyclic olefin resin is too small, the mechanical strength of the film may be deteriorated. The formability of the film may be lowered when the number-average molecular weight of the cyclic olefin resin is too large.

The cyclic olefin resin may be (4) a graft polymer or copolymer in which an unsaturated compound (u) having a polar group (such as carboxyl group, acid anhydride group, epoxy group, amide group, ester group or hydroxyl group) is incorporated in any of the aforementioned cyclic olefin resins (1) to (3). The cyclic olefin resins (1) to (4) can be used in the form of a mixture of two or more kinds thereof.

Examples of the unsaturated compound (u) are (meth)acrylic acid, maleic acid, maleic acid anhydride, itaconic acid anhydride, glycidyl (meth)acrylate, (meth)acrylic acid alkyl ($C_1$-$C_{10}$) ester, maleic acid alkyl ($C_1$-$C_{10}$) ester, (meth)acrylamide and 2-hydroxyethyl (meth)acrylate.

The use of the modified cyclic olefin resin (4), in which the polar group-containing unsaturated compound (u) is introduced by graft polymerization or copolymerization, leads to an increase in compatibility with a metal material or polar resin material so as to allow improvement of strength in various secondary processing such as deposition, sputtering, coating, bonding etc. Thus, the modified cyclic olefin resin (4) is suitable for use in the case where secondary processing is required. There is however a drawback in which the water absorbency of the cyclic olefin resin is increased in the presence of the polar group. For this reason, the content of the polar group (such as carboxyl group, acid anhydride group, epoxy group, amide group, ester group or hydroxyl group) is preferably 0 to 1 mol/kg per 1 kg of the cyclic olefin resin.

[Styrene Elastomer]

The styrene elastomer is of the type having a storage modulus of lower than 100 MPa at 0° C. to 100° C. In other words, the maximum storage modulus of the styrene elastomer is lower than 100 MPa at 0° C. to 100° C. The storage modulus of the styrene elastomer is preferably 20 MPa or lower. The in-plane retardation of the film becomes large when the styrene elastomer has a high storage modulus at 0° C. to 100° C.

The birefringence of a polymer is influenced by two types of factors. One of the factors is orientation refraction caused due to high orientation of molecular chains of the polymer. The orientation refraction depends on the degree of orientation and the characteristic value of the polymer main chain. The other factor is birefringence caused due to stress. The birefringence changes by distortion with the application of an external force.

A styrene elastomer is in a contracted/coiled conformation with the application of no external force. With the application of an external force such as elongation force or shear force, the molecular chain of the styrene elastomer is stretched and oriented in one direction. As the optical property (refractive index) of the styrene elastomer in the main chain direction is different from that in the direction intersecting the main chain direction, the elastomer product in which the molecular chains are highly oriented causes a so-called birefringence phenomenon.

In the present embodiment, the storage modulus of the styrene elastomer is lower than 100 MPa at 0° C. to 100° C. so that the styrene elastomer shows high flowability in a molten state. This leads to a low residual stress in the film and a low degree of orientation of the molecular chains. It is assumed that the film attains a low specific refractive index because of having a negative refractive index of the styrene moiety and a positive refractive index of the ethylene moiety in addition to the above effects.

The number-average molecular weight of the styrene elastomer as measured by GPC method is generally 5000 to 300000, preferably 10000 to 150000, more preferably 20000 to 100000. When the number-average molecular weight of the styrene elastomer is too small, the mechanical strength of the film may be deteriorated. The formability of the film may be lowered when the number-average molecular weight of the styrene elastomer is too large.

The styrene elastomer is a copolymer of styrene and a conjugated diene such as butadiene or isoprene and/or a hydrogenated product thereof. More specifically, the styrene elastomer is a block copolymer containing a hard segment of styrene and a soft segment of conjugated diene. The storage modulus of the styrene elastomer changes with the structure of the soft segment. The refractive index of the styrene elastomer changes with the content of the hard segment, so as to cause a change of haze in the film as a whole. The styrene elastomer is suitably used since it does not require vulcanization. A hydrogenated product of the styrene elastomer is more suitably used because of its high thermal stability.

Examples of the styrene elastomer are styrene/butadiene/styrene block copolymers, styrene/isoprene/styrene block copolymers, styrene/ethylene/butylene/styrene block copolymers, styrene/ethylene/propylene/styrene block copolymers and styrene/butadiene block copolymers.

As the styrene elastomer, there can also be used any of a styrene/ethylene/butylene/styrene block copolymer, a styrene/ethylene/propylene/styrene block copolymer and a styrene/butadiene block copolymer in each of which the double bond of the conjugated diene component is eliminated by hydrogenation (also referred to as hydrogenated styrene elastomer).

There is no particular limitation on the structure of the styrene elastomer. Although the styrene elastomer can have a linear structure, a branched structure or a cross-linked structure, it is preferable that the styrene elastomer has a linear structure for decrease of storage modulus.

In the present embodiment, at least one kind selected from the group consisting of styrene/ethylene/butylene/styrene block copolymers, styrene/ethylene/propylene/styrene block copolymers and hydrogenated styrene/butadiene copolymers is preferably used as the styrene elastomer. In particular, a hydrogenated styrene/butadiene copolymer is more preferably used because of its high tear strength and less increase of haze after storage under environment. In order to avoid impairing compatibility between the hydrogenated styrene/butadiene copolymer and the cyclic olefin, the butadiene-to-styrene ratio of the hydrogenated styrene/butadiene copolymer is preferably in a range of 10 to 90%.

Further, the styrene content of the styrene elastomer is preferably 20 to 40 mol %. The haze of the film is set to a low value by controlling the styrene content to within 20 to 40 mol %.

The cyclic olefin resin composition optionally contains, in addition to the cyclic olefin resin and the styrene elastomer, an additive(s) as needed within the range that does not impair the properties of the cyclic olefin resin composition. Various additives common to thermoplastic resin materials can be used without particular limitation. Examples of the additive(s) are an antioxidant, an ultraviolet absorber, a light stabilizer, a plasticizer, a lubricant, an antistatic agent, a frame retardant, a coloring agent e.g. dye or pigment, a near-infrared absorber, a fluorescent brightening agent, a compounding agent or filler and the like.

The thus-obtained cyclic olefin resin composition film has a tear strength of 60 N/mm or higher, more preferably 100 N/mm or higher, still more preferably 120 N/mm or higher, and has a haze of 15% or lower, preferably 2% or lower. When the tear strength of the film is too low relative to the above range, the film is unfavorably likely to be broken during production or use. When the haze of the film is too high, the properties of the film deviate from the initial settings and cannot be obtained as desired.

2. Production Method of Cyclic Olefin Resin Composition Film

A production method of a cyclic olefin resin composition film according to the present embodiment includes melting a cyclic olefin resin together with a styrene elastomer having a storage modulus of lower than 100 MPa, and then, extruding the resulting molten cyclic olefin resin composition into a film shape in which the styrene elastomer is dispersed in the cyclic olefin resin. The cyclic olefin resin composition film can be unstretched, uniaxially stretched or biaxially stretched.

Figure 2:
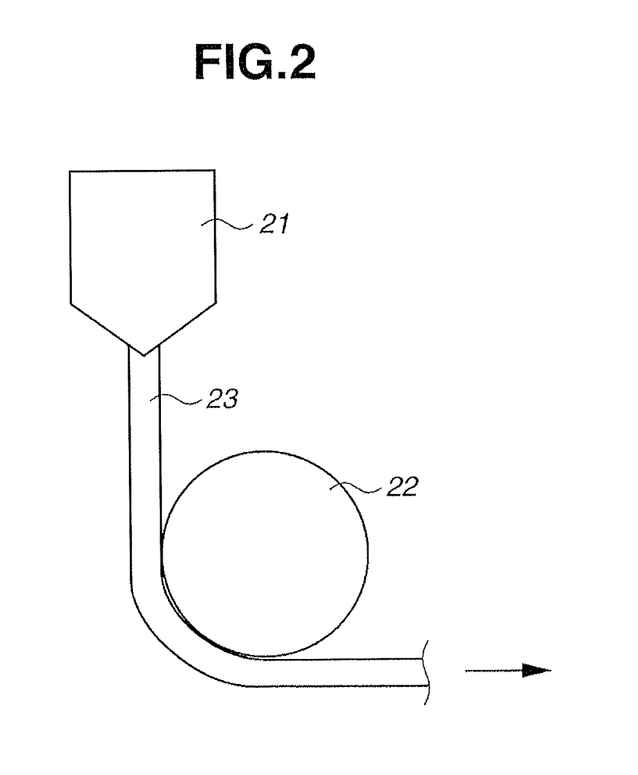
FIG. 2 is a schematic view showing a configuration example of a film production device.

FIG. 2 is a schematic view showing an example of a film production device. The film production device includes a die 21 and a roll 22. The die 21 is in the form of a melt molding die that extrudes a molten resin material 23 into a film shape. The molten resin material 23 contains the above-mentioned cyclic olefin resin composition. The roll 22 is adapted to transfer the resin material 23 extruded in the film shape from the die 21. The roll 22 has formed therein a flow path for a fluid and has the function of adjusting its surface temperature to a given degree by means of a separate temperature controller. There is no particular limitation on the material for the surface of the roll 22. The surface of the roll 22 can be of a metal, rubber, resin or elastomer.

In the present embodiment, the cyclic olefin resin composition in which the above-mentioned cyclic olefin resin and styrene elastomer are contained is used as the resin material 23 and subjected to melt mixing within a temperature range of 210 to 300° C. There is a tendency that the higher the melting temperature, the smaller the minor axis dispersion diameter.

3. Applications to Electronic Apparatuses

The cyclic olefin resin composition film according to the present embodiment can be used for various optical applications such as a phase difference film, a polarizer protective film, a light diffusion plate and, in particular, to a prism sheet and a liquid crystal cell substrate.

The following explanation will be given of the application of the cyclic olefin resin composition film to a phase difference film.

Figure 3:
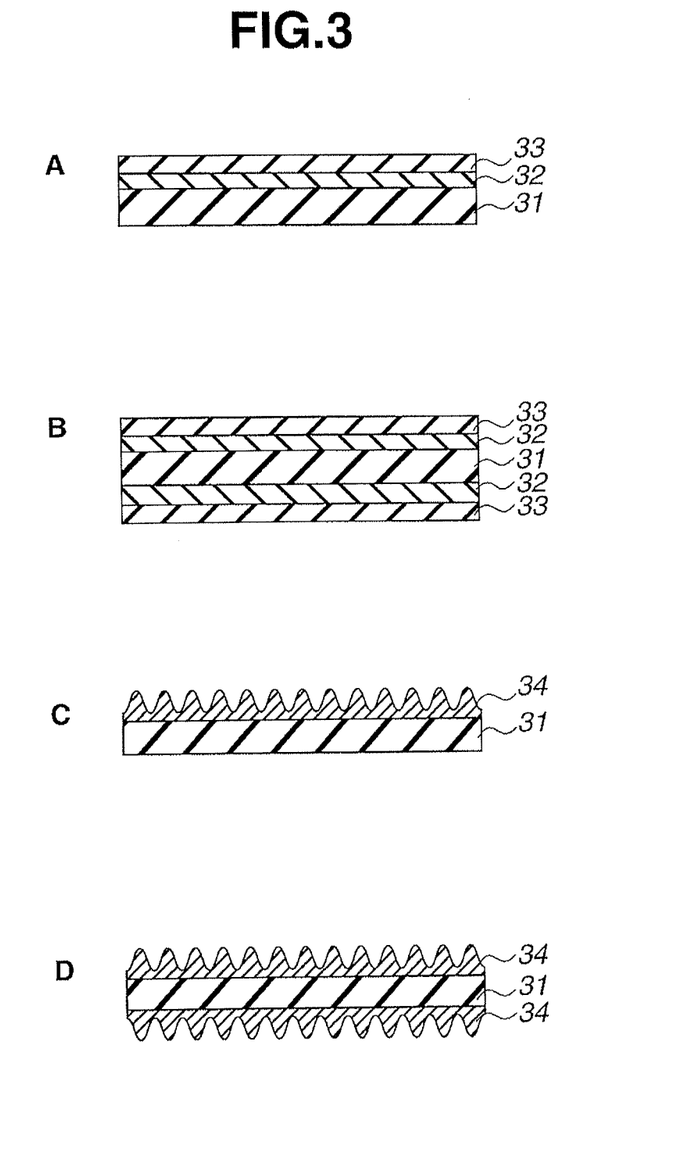
FIGS. 3A and 3B are cross-sectional views showing examples of transparent conductive films.
FIGS. 3C and 3D are cross-sectional views showing examples of transparent conductive films with moth-eye structures.

FIGS. 3A and 3B are cross-sectional views showing examples of transparent conductive films. Each of the transparent conductive films (transparent conductive elements) includes the above-mentioned cyclic olefin resin composition film as a base film (substrate). More specifically, the transparent conductive film has a phase difference film 31 arranged as the base film (substrate) and a transparent conductive layer 33 arranged on at least one surface of the phase difference film 31. FIG. 3A shows the example in which the transparent conductive layer 33 is arranged on one surface of the phase difference film 31, whereas FIG. 3B shows the example in which the transparent conductive layers 33 are arranged on both surfaces of the phase difference film 31. As shown in FIGS. 3A and 3B, a hard coat layer 32 may be arranged between the phase difference film 31 and the transparent conductive layer 33.

The material for the transparent conductive layer 33 is, for example, at least one kind of electrically conductive material selected from the group consisting of metal oxide material, metal material, carbon material and conductive polymer. Examples of the metal oxide material are indium tin oxide (ITO), zinc oxide, indium oxide, antimony-doped tin oxide, fluorine-doped tin oxide, aluminum-doped zinc oxide, gallium-doped zinc oxide, silicon-doped zinc oxide, zinc oxide-tin oxide, indium oxide-tin oxide and zinc oxide-indium oxide-magnesium oxide composite. The metal material can be in the form of a metal nanofiller such as metal nanoparticle or metal nanowire. Examples of the metal material are metals such as copper, silver, gold, platinum, palladium, nickel, tin, cobalt, rhodium, iridium, iron, ruthenium, osmium, manganese, molybdenum, tungsten, niobium, tantalum, titanium, bismuth, antimony and lead, and alloys thereof. Examples of the carbon material are carbon black, carbon fibers, fullerene, graphene, carbon nanotube, carbon microcoil and carbon nanohorn. Examples of the conductive polymer are substituted or unsubstituted polyaniline, substituted or unsubstituted polypyrrole, substituted or unsubstituted polythiophene, and (co)polymers of one kind or two or more kinds thereof.

It is feasible to form the transparent conductive layer 33 by, for example, PVD process such as sputtering, vacuum deposition or ion plating, CVD process, coating process or printing process. The transparent conductive layer 33 may be a transparent electrode with a predetermined electrode pattern. The electrode pattern can be provided in, but is not limited to, a strip shape.

The material for the hard coat layer 32 is preferably an ionization radiation curable resin curable by light or electron beam radiation or a thermosetting resin curable by heating. Particularly preferred is a photosensitive resin curable by ultraviolet radiation. Examples of such a photosensitive resin are acrylic resins such as urethane acrylate, epoxy acrylate, polyester acrylate, polyol acrylate, polyether acrylate and melamine acrylate. For instance, urethane acrylate is obtained by reacting a polyester polyol with an isocyanate monomer or prepolymer, and then, reacting the resulting reaction product with a hydroxyl-containing acrylic or methacrylic monomer. The thickness of the hard coat layer 32 is preferably, but is not specifically limited to, 1 μm to 20 μm.

The transparent conductive film may have a moth-eye structure 34 arranged as an anti-reflection layer on at least one surface of the phase difference film as shown in FIGS. 3C and 3D. FIG. 3C shows the example in which the moth-eye structure 34 is arranged on one surface of the phase difference film 31, whereas FIG. 3D shows the example in which the moth-eye structures 34 are arranged on both surfaces of the phase difference film. The anti-reflection layer arranged on the surface of the phase difference film 11 is not limited to the above moth-eye structure. A conventionally known anti-reflection layer such as a low refractive index layer can be used as the anti-reflection layer.

Figure 4:
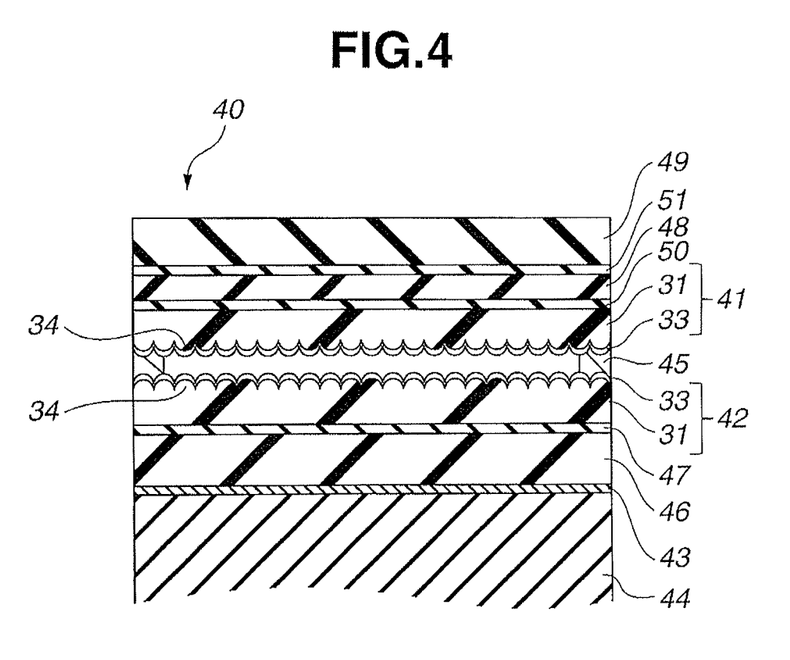
FIG. 4 is a cross-sectional view showing a configuration example of a touch panel.

FIG. 4 is a schematic sectional view showing a configuration example of a touch panel. In this example, the tough panel (input device) 40 is configured as a so-called resistive film touch panel. The resistive film touch panel can be either an analog resistive film touch panel or a digital resistive film touch panel.

The touch panel 40 has a first transparent conductive film 41 and a second transparent conductive film 42 opposite to the first transparent conductive film 41. The first and second transparent conductive films 41 and 42 are bonded together at peripheral portions thereof via a bonding part 45. An adhesive paste, adhesive tape or the like can be used as the bonding part 45. The touch panel 40 is bonded to a display device 44 via a bonding layer 43. An adhesive such as an acrylic adhesive, a rubber adhesive or a silicon adhesive can be used as the material for the bonding layer 43. In view of the transparency, an acrylic adhesive is preferred as the material for the bonding layer 43.

The touch panel 40 also has a polarizer 48 bonded to a touch-side surface of the first transparent conductive film 41 via a bonding layer 50. The above-mentioned transparent conductive film is usable as the first transparent conductive film 41 and/or the second transparent conductive film 42. Herein, the phase difference film as the base film (substrate) is set to λ/4. The adoption of the polarizer 48 and the phase difference film 31 leads to a decrease in reflectance and improvement in visibility.

It is preferable that the touch panel 40 has moth-eye structures 34 arranged on opposing surfaces of the first and second transparent conductive films 41 and 42, that is, on respective surfaces of the transparent conductive layers 33 of these transparent conductive films. The use of such moth-eye structures leads to improvements in the optical properties (such reflection characteristics and transmission characteristics) of the first and second transparent conductive films 41 and 42.

It is preferable that the touch panel 40 has one or more anti-reflection layers arranged on the touch-side surface of the first transparent conductive film 41 for decrease in reflectance and improvement in visibility.

For improvement in scratch resistance, it is preferable that the touch panel 40 has a hard coat layer arranged on the touch-side surface of the first transparent conductive film 41. In this case, it is preferable to impart soil resistance to a surface of the hard coat layer.

It is preferable that the touch panel 40 has a front panel (surface member) 49 bonded to the touch-side surface of the first transparent conductive film 41 via a bonding layer 51. It is further preferable that the touch panel 40 has a glass substrate 46 bonded via a bonding layer 47 to the display device 44 side surface of the second transparent conductive film 42.

Furthermore, it is preferable that the touch panel 40 has a plurality of structures on the display device 44 side surface of the second transparent conductive film 42 so as to improve adhesion of the touch panel 40 and the bonding layer 53 by the anchor effect of the plurality of structures. As the structure, a moth-eye structure is preferably used for suppression of interface reflection.

As the display device 44, there can be used various types of display devices such as a liquid crystal display, a cathode ray tube (CRT) display, a plasma display panel (PDP), an electro luminescence (EL) display and a surface-conduction electron-emitter display (SED).

Next, an electronic apparatus with the above input device 40 will be explained below.

Figure 5:
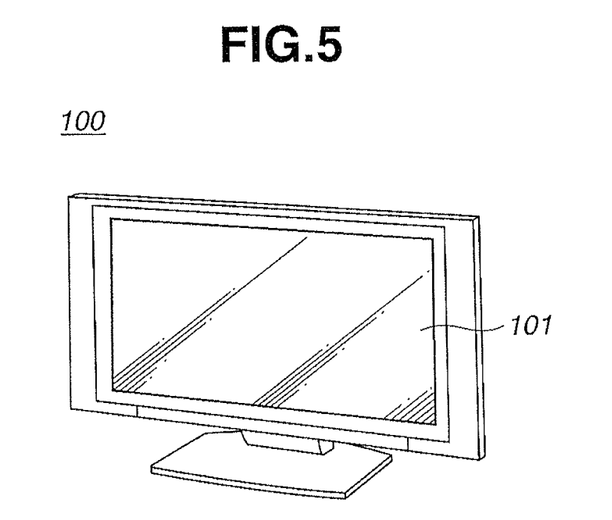
FIG. 5 is an external view showing an example of a television apparatus as an electronic apparatus.

FIG. 5 is an external view showing an example of a television apparatus as the electronic apparatus. The television apparatus 100 has a display portion 101. The display portion 101 is provided with the touch panel 40.

Figure 6:
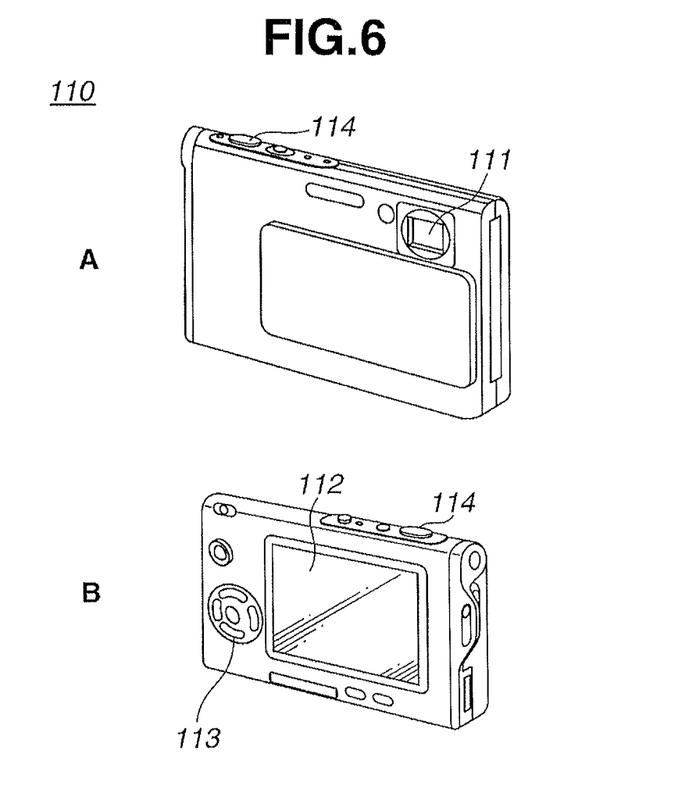
FIGS. 6A and 6B are external views showing an example of a digital camera as an electronic apparatus.

FIGS. 6A and 6B are external views showing an example of a digital camera as the electronic apparatus. Herein, FIG. 6 is an external view of the digital camera as seen from the front side; and FIG. 6B is an external view of the digital camera as seen from the back side. The digital camera 110 has a flash light emitting portion 111, a display portion 112, a menu switch 113 and a shutter button 114. The display portion 112 is provided with the touch panel 40.

Figure 7:
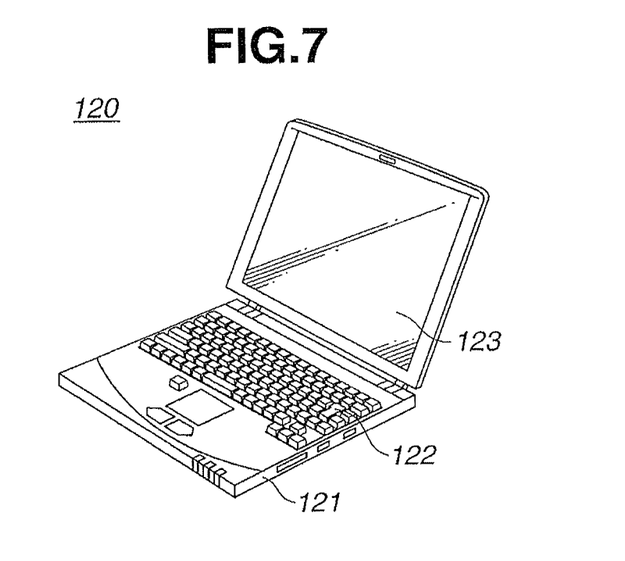
FIG. 7 is an external view showing an example of a laptop computer as an electronic apparatus.

FIG. 7 is an external view showing an example of a laptop computer as the electronic apparatus. The laptop computer 120 has a body portion 121 including a keyboard 122 for inputting characters and a display portion 123 for displaying an image. The display portion 123 is provided with the touch panel 40.

Figure 8:
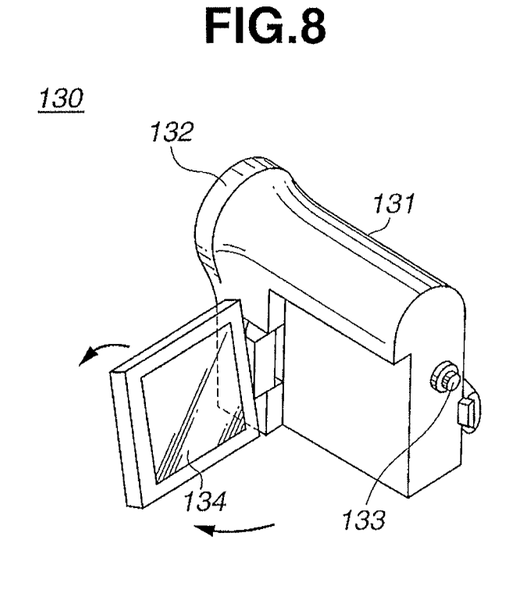
FIG. 8 is an external view showing an example of a video camera as an electronic apparatus.

FIG. 8 is an external view showing an example of a video camera as the electronic apparatus. The video camera 130 has a body portion 131, a subject-photographing lens 132 provided on a forward-facing side surface of the body portion, a photographing start/stop switch 133 and a display portion 134. The display portion 134 is provided with the touch panel 40.

Figure 9:
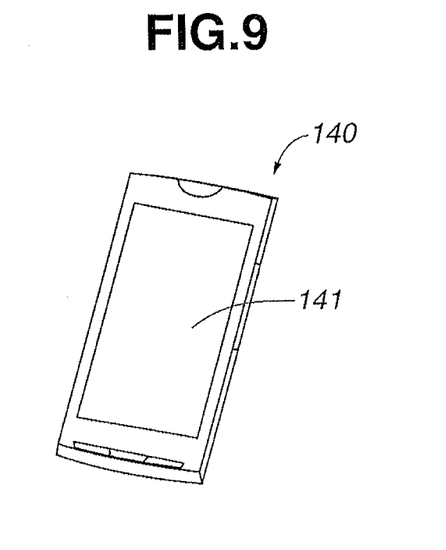
FIG. 9 is an external view showing an example of a mobile phone as an electronic apparatus.

FIG. 9 is an external view showing an example of a mobile phone as the electronic apparatus. The mobile phone 140 is configured as a so-called smartphone having a display portion 141 provided with the touch panel 40.

Figure 10:
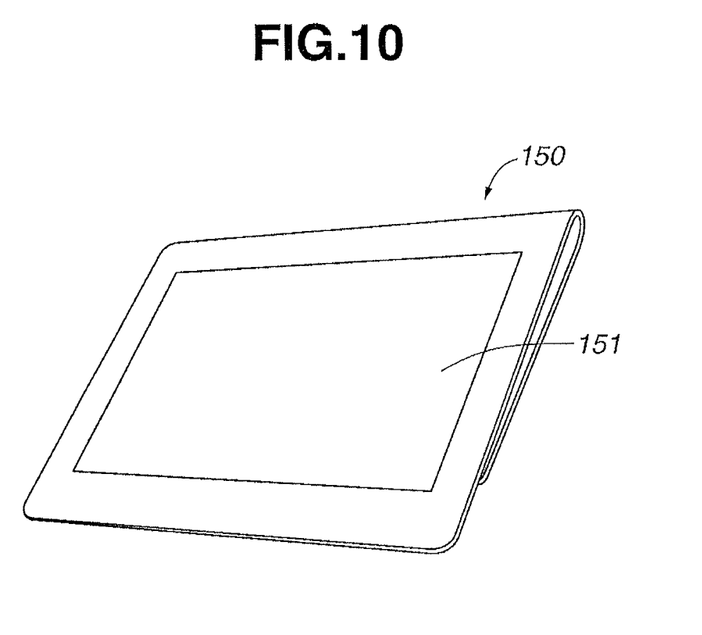
FIG. 10 is an external view showing an example of a tablet computer as an electronic apparatus.

FIG. 10 is an external view showing an example of a tablet computer as the electronic apparatus. The tablet computer 150 has a display portion 151 provided with the touch panel 40.

The above-mentioned electronic apparatus, in which cyclic olefin resin composition film having a small in-plane retardation and high toughness is used in the display portion, achieves high durability and high-quality image displaying.

EXAMPLES

4. Examples

Hereinafter, the present invention will be described in more detail by way of the following examples. In the following examples, cyclic olefin resin composition films in each of which a styrene elastomer having a specific storage modulus was added to a cyclic olefin resin were produced and tested for the in-plane retardation, tear strength and haze. It is herein noted that the following examples are not intended to limit the present invention thereto.

The storage modulus and styrene content of each styrene elastomer, and the in-plane retardation, tear strength and haze of each cyclic olefin resin composition film were measured as follows.

[Storage Modulus]

A test sample having a size of 8 mm×20 mm and a thickness of 0.2 to 0.3 mm was prepared from the styrene elastomer. The storage modulus G' of the styrene elastomer sample was measured with a viscoelastometer (DMS6100 manufactured by SII Nanotechnology Inc.) according to JIS K 7344-4. The test atmosphere was of $N_2$; the test initiation temperature was set to $-70°$ C. to $200°$ C.; and the measurement frequency was set to 1 Hz. The maximum measurement result at $0°$ C. to $100°$ C. was determined as the storage modulus.

[Styrene Content]

The styrene content of the styrene elastomer was measured with a NMR (nuclear magnetic resonance) spectrometer.

[In-plane Retardation]

The in-plane retardation $R_0$ of the cyclic olefin resin composition film was measured with an optical material inspection system (RETS-100 manufactured by Otsuka Electronics Co., Ltd.). The in-plane retardation $R_0$ was evaluated as: "○" when it was smaller than 10 nm; and "x" when it was larger than or equal to 10 nm.

[Tear Strength (Right Angled Tear Strength)]

The tear strength of a film sample having a thickness of 80 μm was measured according to JIS K 7128. The sample used was a Type-3 test piece. The measurement test was performed with a tensile tester (AG-X manufactured by Shimadzu Corporation) at a speed of 200 mm/min. The average value of the measurement results in MD and TD directions was determined as the tear strength. The tear strength was evaluated as: "○" when it was higher than or equal to 60 N/mm; and "x" when it was lower than 60 N/mm. When the tear strength of the film is higher than or equal to 60 N/mm, the film has a reduced possibility of breakage during the subsequent step such as coating step and thus can be put into practical use.

[Haze]

The haze of a film sample having a thickness of 80 μm was measured with a haze meter (HM 150 manufactured by Murakami Color Research Laboratory).

[Cyclic Olefin Resin and Styrene Elastomer]

The cyclic olefin resin used was TOPAS6013-S04 (chemical name: ethylene-norbornene addition copolymer, manufactured by Polyplastics Co., Ltd.).

As shown in TABLE 1, the styrene elastomers used were of the following nine kinds: Tuftec H1041 (manufactured by Asahi Kasei Advance Corporation), Tuftec H1052X (manufactured by Asahi Kasei Advance Corporation), Tuftec H1053 (manufactured by Asahi Kasei Advance Corporation), Tuftec H1062 (manufactured by Asahi Kasei Advance Corporation) and Tuftec H1517 (manufactured by Asahi Kasei Advance Corporation), each as a styrene/ethylene/butylene/styrene block copolymer; S.O.E L609 (manufactured by Asahi Kasei Advance Corporation) and S.O.E L606 (manufactured by Asahi Kasei Advance Corporation), each as a hydrogenated styrene/butadiene block copolymer; and Septon 2104 (manufactured by Kuraray Co., Ltd.) and Septon 8104 (manufactured by Kuraray Co., Ltd.), each as a styrene/ethylene/butylene/styrene block copolymer.

TABLE 1

| Trade name | Chemical structure |
|---|---|
| Tuftec H1041 | styrene/ethylene/butylene/styrene block copolymer |
| Tuftec H1052X | styrene/ethylene/butylene/styrene block copolymer |
| Tuftec H1053 | styrene/ethylene/butylene/styrene block copolymer |
| Tuftec H1062 | styrene/ethylene/butylene/styrene block copolymer |
| Tuftec H1517 | styrene/ethylene/butylene/styrene block copolymer |
| S.O.E L609 | hydrogenated styrene/butadiene block copolymer |
| S.O.E L606 | hydrogenated styrene/butadiene block copolymer |
| Septon 2104 | styrene/ethylene/butylene/styrene block copolymer |
| Septon 8104 | styrene/ethylene/butylene/styrene block copolymer |

Example 1

As the styrene elastomer, Tuftec H1052X was used. As shown in TABLE 2, the storage modulus of the styrene elastomer was 10 MPa: and the styrene content of the styrene elastomer was 12 mol %.

A cyclic olefin resin composition was prepared by mixing 90 parts by mass of the cyclic olefin resin with 10 parts by mass of the styrene elastomer. Using a T-die twin-screw extruder (diameter: 25 mm, length: 26D, T-die width: 160 mm), the cyclic olefin resin composition was kneaded at a predetermined temperature within the temperature range of 210° C. to 300° C., and then, extruded at a speed of 250 g/min into a film shape of 80 μm thickness. The extruded film was wound on a roll.

As shown in TABLE 2, the retardation $R_0$ of the film was 2.4 nm and was evaluated as ○. The tear strength of the film was 85 N/m and was evaluated as ○. Further, the haze of the film was 13.8%.

Example 2

The film was produced in the same manner as in Example 1, except that Tuftec H1062 was used as the styrene elastomer.

As shown in TABLE 2, the storage modulus of the styrene elastomer was 20 MPa; and the styrene content of the styrene elastomer was 11 mol %. Further, the retardation $R_0$ of the film was 4.0 nm and was evaluated as ○. The tear strength of the film was 70 N/m and was evaluated as ○. The haze of the film was 11.3%.

Example 3

The film was produced in the same manner as in Example 1, except that Tuftec H1041 was used as the styrene elastomer.

As shown in TABLE 2, the storage modulus of the styrene elastomer was 90 MPa; and the styrene content of the styrene elastomer was 20 mol %. Further, the retardation $R_0$ of the film was 7.7 nm and was evaluated as ○. The tear strength of the film was 82 N/m and was evaluated as ○. The haze of the film was 1.5%.

Example 4

The film was produced in the same manner as in Example 1, except that S.O.E L609 was used as the styrene elastomer.

As shown in TABLE 2, the storage modulus of the styrene elastomer was 6 MPa; and the styrene content of the styrene elastomer was 40 mol %. Further, the retardation $R_0$ of the film was 1.0 nm and was evaluated as ○. The tear strength of the film was 90 N/m and was evaluated as ○. The haze of the film was 1.2%.

Example 5

The film was produced in the same manner as in Example 1, except that S.O.E L606 was used as the styrene elastomer.

As shown in TABLE 2, the storage modulus of the styrene elastomer was 7 MPa; and the styrene content of the styrene elastomer was 36 mol %. Further, the retardation $R_0$ of the film was 0.5 nm and was evaluated as ○. The tear strength of the film was 102 N/m and was evaluated as ○. The haze of the film was 0.7%.

Comparative Example 1

The film was produced in the same manner as in Example 1, except that Tuftec H1053 was used as the styrene elastomer.

As shown in TABLE 2, the storage modulus of the styrene elastomer was 100 MPa; and the styrene content of the styrene elastomer was 18 mol %. Further, the retardation $R_0$ of the film was 11.3 nm and was evaluated as ×. The tear strength of the film was 70 N/m and was evaluated as ○. The haze of the film was 8.8%.

Comparative Example 2

The film was produced in the same manner as in Example 1, except that Tuftec H1517 was used as the styrene elastomer.

As shown in TABLE 2, the storage modulus of the styrene elastomer was 300 MPa; and the styrene content of the styrene elastomer was 29 mol %. Further, the retardation $R_0$ of the film was 15.3 nm and was evaluated as ×. The tear strength of the film was 62 N/m and was evaluated as ○. The haze of the film was 1.4%.

Comparative Example 3

The film was produced in the same manner as in Example 1, except that Septon 8104 was used as the styrene elastomer.

As shown in TABLE 2, the storage modulus of the styrene elastomer was 800 MPa; and the styrene content of the styrene elastomer was 44 mol %. Further, the retardation $R_0$ of the film was 14.6 nm and was evaluated as ×. The tear strength of the film was 75 N/m and was evaluated as ○. The haze of the film was 2.0%.

Comparative Example 4

The film was produced in the same manner as in Example 1, except that Septon 2104 was used as the styrene elastomer.

As shown in TABLE 2, the storage modulus of the styrene elastomer was 850 MPa; and the styrene content of the styrene elastomer was 50 mol %. Further, the retardation $R_0$ of the film was 15.3 nm and was evaluated as ×. The tear strength of the film was 70 N/m and was evaluated as ○. The haze of the film was 3.2%.

Comparative Example 5

The film was produced in the same manner as in Example 1, except that no styrene elastomer was added.

As shown in TABLE 2, the retardation $R_0$ of the film was 0.4 nm and was evaluated as ○. The tear strength of the film was 55 N/m and was evaluated as ×. The haze of the film was 0.2%.

TABLE 2

| | Styrene elastomer Trade name | Storage modulus (MPa) | Styrene content (mol %) | Retardation $R_0$ (nm) | Tear strength (N/mm) | Haze (%) |
|---|---|---|---|---|---|---|
| Example 1 | Tuftec H1052X | 10 | 12 | ○ (2.4) | ○ (85) | 13.8 |
| Example 2 | Tuftec H1062 | 20 | 11 | ○ (4.0) | ○ (70) | 11.3 |
| Example 3 | Tuftec H1041 | 90 | 20 | ○ (7.7) | ○ (82) | 1.5 |
| Example 4 | S.O.E L609 | 6 | 40 | ○ (1.0) | ○ (90) | 1.2 |
| Example 5 | S.O.E L606 | 7 | 36 | ○ (0.5) | ○ (102) | 0.7 |
| Comparative Example 1 | Tuftec H1053 | 100 | 18 | x (11.3) | ○ (70) | 8.8 |
| Comparative Example 2 | Tuftec H1517 | 300 | 29 | x (15.3) | ○ (62) | 1.4 |
| Comparative Example 3 | Septon 8104 | 800 | 44 | x (14.6) | ○ (75) | 2.0 |
| Comparative Example 4 | Septon 2104 | 850 | 50 | x (15.3) | ○ (70) | 3.2 |
| Comparative Example 5 | — | — | — | ○ (0.4) | x (55) | 0.2 |

The films of Comparative Examples 1 to 4 in which the storage modulus of the styrene elastomer was 100 MPa or higher had a large retardation value $R_0$ of 10 nm or larger and were evaluated as x. The film of Comparative Example 5 in which no styrene elastomer was added, had a low tear strength and was evaluated as x.

By contrast, the films of Examples 1 to 5 in which the storage modulus of the styrene elastomer was lower than 100 MPa had a favorable retardation value $R_0$ of less than 10 nm. Among others, the films of Examples 1, 2, 4 and 5 in which the storage modulus of the styrene elastomer was lower than or equal to 20 MPa had a particularly favorable retardation value $R_0$ of less than 5 nm in.

The films of Examples 3 to 5 in which the styrene content of the styrene elastomer was 20 to 40 mol % had a haze of 2% or lower. Further, the films of Examples 4 and 5 in which the hydrogenated styrene/butadiene block copolymer was added as the styrene elastomer had a tear strength of 90 N/m or higher in.

DESCRIPTION OF REFERENCE NUMERALS

11: Cyclic olefin resin, 12: Styrene elastomer, 21: Die, 22: Roll, 23: Resin material, 31: Phase difference film, 32: Hard coat layer, 33: Transparent conductive layer, 34: Moth-eye structure, 40: Touch panel, 41: First transparent conductive film, 42: Second transparent conductive film, 43: Bonding layer, 44: Display device, 45: Bonding part, 46: Glass substrate, 47: Bonding layer, 48: Polarizer, 49: Front panel, 50: Bonding layer, 51: Bonding layer, 100: Television apparatus, 101: Display portion, 110: Digital camera 110, 111: Light emitting portion, 112: Display portion, 113: Menu switch, 114: Shutter button, 120: Laptop computer, 121: Body portion, 122: Keyboard, 123: Display portion, 130: Video camera, 131: Body portion, 132: Lens 132, 133: Start/stop switch, 134: Display portion 134, 140: Mobile phone, 141: Display portion, 150: Tablet computer, 151: Display portion

The invention claimed is:

1. A cyclic olefin resin composition film, comprising:
   an addition copolymer of norbornene and ethylene; and
   a styrene elastomer having a storage modulus of 20 MPa or lower at 0° C. to 100° C.,
   wherein the styrene elastomer has a styrene content of 20 to 40 mol %.

2. The cyclic olefin resin composition film according to claim 1, wherein the styrene elastomer is at least one selected from the group consisting of styrene/ethylene/butylene/styrene block copolymers, styrene/ethylene/propylene/styrene block copolymers, and hydrogenated styrene/butadiene copolymers.

3. The cyclic olefin resin composition film according to claim 1, wherein the styrene elastomer is dispersed in the cyclic olefin in an amount of 5 to 35 wt %, based on a total amount of the cyclic olefin resin and the styrene elastomer.

4. The cyclic olefin resin composition film according to claim 2, wherein the styrene elastomer is dispersed in the cyclic olefin in an amount of 5 to 35 wt %, based on a total amount of the cyclic olefin resin and the styrene elastomer.

5. A transparent conductive element comprising the cyclic olefin resin composition film according to claim 1 as a substrate.

6. An input device comprising the cyclic olefin resin composition film according to claim 1.

7. A display device comprising the cyclic olefin resin composition film according to claim 1.

8. An electronic apparatus comprising the cyclic olefin resin composition film according to claim 1.

* * * * *